Aug. 26, 1952  R. H. REDFIELD  2,608,127
PROTECTIVE COATING FOR MOTION-PICTURE FILMS
Filed May 20, 1948
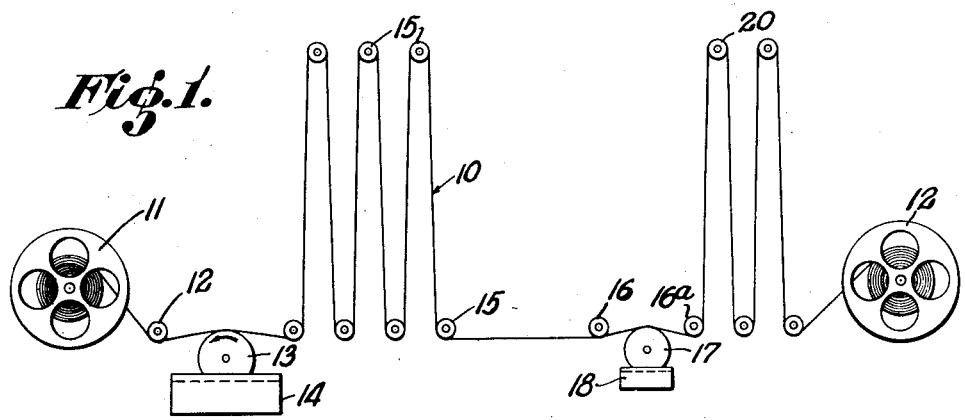
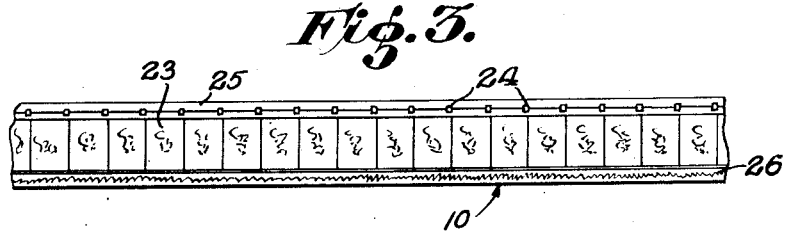
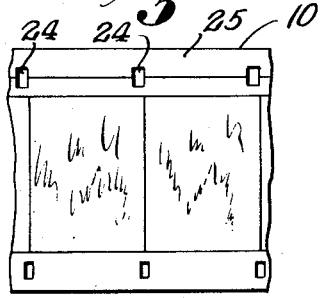
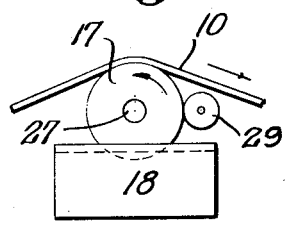
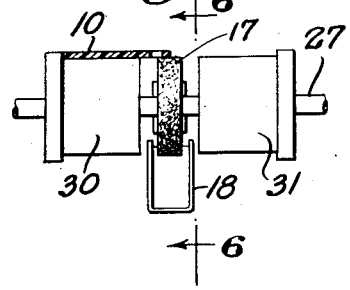
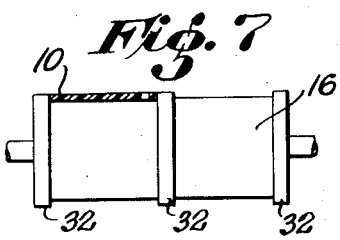
INVENTOR:
ROBERT H. REDFIELD
BY
Watson W. Harbaugh
ATT'Y Patented Aug. 26, 1952

2,608,127

UNITED STATES PATENT OFFICE 2,608,127

PROTECTIVE COATING FOR MOTION-PICTURE FILMS

Robert H. Redfield, Oak Park, Ill.

Application May 20, 1948, Serial No. 30,787

5 Claims. (Cl. 88—19.5)

This invention relates generally to an improved protective coating for motion picture film and to an improved method and apparatus for applying the coating to the film.

Protective coatings have been applied to motion picture films for many years, the purpose of the coatings being in most cases to protect the emulsion on the surface of the positive film against abrasion or scratching which is encountered when the film is run through a projector. A great many different kinds of coatings have been used, but none of them have proved wholly satisfactory. These coatings may be divided into two general types: (1) those which are harder than the emulsion and therefore resistant to abrasion but which have no lubricating properties and (2) those which also serve as a lubricant. This latter type of coating usually comprises a layer of wax applied to the film on the emulsion side or on both sides. Although the invention is described herein in connection with a coating of the latter type it is not limited to such coatings for its principles may be readily applied to the former type.

One of the major difficulties experienced with coatings heretofore in use is that such coatings are by necessity quite thin and transparent to light, and, consequently, it is difficult to tell by inspection whether a film has been coated or not and if coated what the condition of the coating is, i. e., whether the coating has been scratched and what is the thickness of the coating remaining.

One object of this invention is to provide a protective coating having a tell-tale indicator portion by which it is possible to tell at a glance whether or not the given film has been coated.

Another object of this invention is to provide an indicator stripe which extends the entire length of the film and which may be readily examined to determine the condition of the protective coating of the film.

Another object is to provide a film coating over the emulsion as well as the perforated edge portion of the film and an indicator coating which overlaps that portion of the film coating which covers the perforated edge portion.

Another object is to provide an indicator in the form of a colored stripe on the edge of the film which wears simultaneously with the protective coating but which is visible so that the relative thickness of the film coating may be estimated by observing the depth of color of the indicator.

A further object is to provide a colored indicator stripe upon which scratches or abrasion will be readily apparent and which may be used on either colored or black and white films whether originals, master prints, duplicate negatives, work prints, or positive prints.

A further object is to provide an indicator stripe so located as not to interfere with pictures projected or with the sound being produced in the event that the sound film is coated.

A further object is to provide an indicator stripe located on that part of the film subject to the greatest amount of wear.

Another object is to provide a film coating and an indicator coating which overlays the film coating so that wear is most likely to occur on the indicator coating.

A further object is to provide a novel method and apparatus for applying the coating material and indicator stripe to motion picture film.

Other and additional objects of this invention will present themselves to those familiar with the art on reading the following specification in conjunction with the drawing and the appended claims.

In the drawing:

Fig. 1 is a schematic view showing the manner in which the protective coating and the indicator stripe of the invention are applied to a reel of motion picture film;

Fig. 2 is an enlarged cross section of a strip of film coated according to this invention;

Fig. 3 is a view showing a strip of sound film after coating;

Fig. 4 is an enlarged view of a portion of a strip of silent film;

Fig. 5 is an enlarged view showing the stripe-applying roller arrangement;

Fig. 6 is a vertical section taken on line 6—6 of Fig. 5; and

Fig. 7 is a view of one of the feed rollers which locates the film during its passage over the striped line roller.

The preferred method of applying the coating of this invention to a strip of film 10 is shown in Fig. 1. The film 10 is fed from a reel 11 over a feed roller 12 and over the surface of an absorbent roller 13. The roller 13 rotates through a reservoir 14 containing the protective coating solution, and as the film 10 passes over the roller 13 a layer of the solution is deposited thereon. From the roller 13 the film passes over a series of drying rollers 15 solvent evaporating from the coating solution and causing the coating to harden or solidify. From the drying rollers 15 the film passes over another feed roller 16 and over a stripe applying roller 17 of absorbent material such as felt. A reservoir 18 containing the indicator solution is mounted below the roller 17 similarly to the coating solution reservoir 14 and the roller 17 rotates through the solution depositing a stripe on the film 10. After passing over a second set of drying rollers 20, the film 10 is rolled on to a second reel 12 and the process is complete.

The preferred coating solution comprises a hard wax such as beeswax, carnauba or paraffine dissolved in a solvent such as carbon tetrachloride, lacquer thinner, xylene, toluene, or trichloroethylene. Inasmuch as the solvent is evaporated during the process, any substance which will dissolve the wax and not the film and which does not react chemically with either may be employed. The wax solution preferably has a concentration of approximately one ounce of wax per gallon of solvent.

The indicator stripe solution is preferably made so as to be identical with the coating solution except that an oil soluble dye is dissolved therein. For this purpose oil soluble aniline dyes have proved very satisfactory. In practice the simplest method of making the indicator solution is to take a portion of the coating solution and add the desired amount of dye to it, the amount of dye being dependent on the depth of color desired. Black and white are considered to be colors.

When other coatings than wax are to be employed, the process is exactly the same except that a suitable solvent for the coating material must be used and a dye or color which is soluble in the solution is chosen.

After the film 10 has been coated it appears as shown in Figs. 2, 3, and 4. As shown in Fig. 2 the emulsion 22 is completely covered by the protective coating 23, the coating 23 forming a layer over the surface of the emulsion 22 and filling those spots from which the emulsion has been dissolved during the process of development with the result that the surface of the film is substantially flat. In the example illustrated, it will be noted that the emulsion does not cover the sprocket holes 24 and that consequently the coating 23 is not quite as high on that side of the film 10 as it is over the remaining part. The indicator coating 25 lies on top of the protective coating 23 at the edge of the film 10. Thus the indicator coating is in the form of a colored stripe along the side of the film 10 and extends inwardly to approximately the mid-point of the sprocket holes 24. It will be noted that the heights of the top of the indicator coating and the top of the protective coating above the film surface are substantially identical.

In Fig. 2 the thickness of the protective coating 23, and the emulsion 22, and the indicator stripe 25 have been exaggerated for the process of illustration. Actually these coatings are approximately 1/1000 or 2/1000 of an inch in thickness when conventional 16 mm. or 35 mm. film is processed.

16 mm. sound film is usually provided with sprocket openings on one side only, the other side of the film being occupied by the sound track 26. On such film the emulsion is likely to be applied to either side of the film, some films being run through the projector with the emulsion side adjacent the light source and others with the emulsion away from the light source. Consequently, it is necessary to employ an apparatus which will coat the emulsion regardless of which side of the film it lies on and which will apply the indicator stripe to the sprocket side of the film when sprocket openings are present only on one side. To accomplish this, a novel arrangement for applying the indicator stripe has been provided. This portion of the apparatus is shown schematically in Figs. 5, 6, and 7.

The indicator solution applicator roll 17 is preferably formed of felt and is mounted on a shaft 27 being rigidly attached thereto. The shaft 27 is driven in the opposite direction from the film 10 so that the surface of the roller 17 wipes over the surface of the film 10. A pair of guide rollers 30 and 31 are mounted on the shaft 27 but are free to rotate independently thereof. Actually these rollers 30 and 31 rotate in the direction of film movement and do not therefore exert a traction on the film. An adjustable pressure roller 29 is provided and serves to prevent excessive quantities of the solution being deposited on the film 10.

The feed rollers 16 have three flanges 32 thereon so that two tracks for the film 10 result. When the film 10 is in the left hand track as shown in Fig. 7, it passes over the roller 30 in Fig. 5, the right hand edge of the film coming into contact with the dye roller 17. When the film 10 is shifted to the right hand track of the rollers as shown in Fig. 7, it passes over the right hand roller 31 in Fig. 5 and the left hand edge comes into contact with the feed roller 17. Thus when the sprocket holes 24 are on one side of the film 10, it is run over the track on that side of the feed roller which causes the perforated portion to pass over the dye roller. If the sprocket holes 24 are on the other side of the film, it is run over the other side of the feed roller to accomplish the same result.

In order to insure that the film 10 will always remain in contact with the dye roller 17, a conventional friction drag brake (not shown) is provided on the roller 16. This brake exerts a slight retarding effect on the roller 16 which thereby exerts a slight tension on the film 10. No brake is provided on the opposite feed roller 16a which is otherwise identical with the roller 16.

From the foregoing it will be seen that a novel improved protective coating for film has been provided which makes it possible to readily observe the condition of the coating. Thus a film owner may decide, by merely examining the indicator stripe, whether a film should be recoated eliminating the need for recoating films at intervals, whether they need it or not just to be on the safe side, and insuring that films in need of recoating will be detected as soon as the need exists.

Various changes or modifications in the coating, apparatus, and process such as the application of the indicator stripe before the coating is applied so that the coating overlays the stripe and others which will occur to those familiar with the art may be made without departing from the spirit of this invention whose scope is defined by the following claims.

What is claimed is:

1. A motion picture film comprising a strip of transparent flexible material having a plurality of spaced sprocket holes along one edge portion, a developed emulsion surface covering a major portion of the strip, a transparent invisible protective coating covering said developed emulsion surface and said edge portion, and a colored wear indicator stripe along said edge portion of said film overlaying the protective coating and having substantially the same wearing qualities as said protective coating, whereby the relative wear of the transparent coating may be inferentially determined by visual inspection of the degree of wear on the colored stripe, the stripe overlaying the protective coating and being disposed at that portion of the film subjected to greatest wear.

2. A motion picture film comprising a strip of transparent flexible material having a plurality of spaced sprocket holes along one edge portion, a developed emulsion surface covering a major portion of the strip not including the edge portion having said sprocket holes, a transparent invisible protective coating covering said developed emulsion surface and said edge portion, and a colored wear indicator stripe along the sprocket portion of said film overlaying the protective coating and having substantially the same wearing qualities as said protective coating, whereby the relative wear of the transparent coating may be inferentially determined by visual inspection of the degree of wear of the colored stripe.

3. A strip of developed sound motion picture film having a central area devoted to the picture frames, a side area having a sound track thereon and another side area containing sprocket hole means for conducting the film through a projector, a transparent protective coating over the central area and the sound track area of the film, and a colored stripe along the other side area for indicating the degree of wear of the invisible transparent coating, said stripe being a coating containing a dye and having substantially the same wearing qualities as said transparent coat, whereby the degree of wear of the transparent coating may be inferentially determined by visual inspection of the colored coating.

4. A strip of developed motion picture film having a central area devoted to the picture frames, a side area containing sprocket hole means for conducting the film through a projector, a transparent protective coating of wax over the central area of the film, and a colored stripe along the side where greatest wear occurs for indicating the degree of wear of the invisible transparent coating, said stripe being a wax coating containing a dye and having substantially the same wearing qualities as said transparent coating, whereby the relative wear of the transparent coating may be inferentially determined by visual inspection of the degree of wear of the colored coating.

5. A strip of developed motion picture film having a central area devoted to the picture frames, a side area containing sprocket hole means for conducting the film through a projector, a transparent protective coating over the central area of the film, and a colored stripe along said side area where greatest wear occurs for indicating the degree of wear of the invisible transparent coating, said stripe being a coating containing a dye and having substantially the same wearing qualities as said transparent coating, whereby the relative wear of the transparent coating may be inferentially determined by visual inspection of the degree of wear of the colored coating.

ROBERT H. REDFIELD.

REFERENCES CITED

The following references are of record in the file of this patent:

UNITED STATES PATENTS

| Number | Name | Date |
|---|---|---|
| 1,203,548 | Trivelli | Oct. 31, 1916 |
| 1,226,655 | Grosvenor | May 22, 1917 |
| 1,453,920 | Clark | May 1, 1923 |
| 1,548,951 | Malone | Aug. 11, 1925 |
| 1,787,825 | Jones | Jan. 6, 1931 |
| 1,849,232 | Hickman | Mar. 15, 1932 |
| 1,892,473 | Rodde | Dec. 27, 1932 |
| 2,059,829 | Ward | Nov. 3, 1936 |
| 2,331,575 | Simons | Oct. 12, 1943 |
| 2,331,746 | Talbot | Oct. 12, 1943 |
| 2,376,184 | Rand | May 15, 1945 |

FOREIGN PATENTS

| Number | Country | Date |
|---|---|---|
| 240,532 | Great Britain | Oct. 1, 1925 |